(12) United States Patent
Zrodowski

(10) Patent No.: US 12,416,067 B2
(45) Date of Patent: Sep. 16, 2025

(54) ULTRASOUND SYSTEM FOR METALS AND THEIR ALLOYS PROCESSING AND METHOD OF LIQUID METALS AND THEIR ALLOYS PROCESSING

(71) Applicant: AMAZEMET SPOLKA Z OGRANICZONA ODPOWIEDZIALNOSCIA, Warsaw (PL)

(72) Inventor: Lukasz Zrodowski, Gdansk (PL)

(73) Assignee: AMAZEMET SPOLKA Z OGRANICZONA ODPOWIEDZIALNOSCIA, Warsaw (PL)

( * ) Notice: Subject to any disclaimer, the term of this patent is extended or adjusted under 35 U.S.C. 154(b) by 420 days.

(21) Appl. No.: 18/041,291

(22) PCT Filed: Aug. 11, 2021

(86) PCT No.: PCT/IB2021/057402
§ 371 (c)(1),
(2) Date: Feb. 10, 2023

(87) PCT Pub. No.: WO2022/034517
PCT Pub. Date: Feb. 17, 2022

(65) Prior Publication Data
US 2023/0304131 A1  Sep. 28, 2023

(30) Foreign Application Priority Data
Aug. 12, 2020 (PL) .......................... 434866

(51) Int. Cl.
*B06B 3/00* (2006.01)
*C22C 1/02* (2006.01)

(52) U.S. Cl.
CPC ............... *C22C 1/026* (2013.01); *B06B 3/00* (2013.01)

(58) Field of Classification Search
CPC ....................................................... B06B 3/00
See application file for complete search history.

(56) References Cited

U.S. PATENT DOCUMENTS 4,649,060 A * 3/1987 Ishikawa ................. C22C 47/08
427/601
6,051,913 A * 4/2000 King ........................ H04R 1/00
310/322

(Continued)

*Primary Examiner* — Christopher S Kessler
(74) *Attorney, Agent, or Firm* — Leber IP Law; Shelly M. Fujikawa

(57) ABSTRACT

An ultrasound system for processing of liquid metal and their alloys, comprising at least one ultrasound transducer and at least one composite waveguide made of a composite material comprising a reinforcement and a matrix. The ultrasound transducer is coupled with the composite waveguide so that during operation it excites a standing wave of mechanical vibrations in the composite waveguide. According to the invention, the matrix comprises a metallic and/or ceramic material whereas the reinforcement comprises fibers of metallic and/or ceramic material. Mechanical vibrations are transverse to the fibers of the reinforcement material. A method of processing of materials, in which material is melted and the melted material is subjected to the operating of a vibrating waveguide in the ultrasound system, characterized in that the ultrasound system according to the invention is used.

14 Claims, 11 Drawing Sheets

(56) References Cited

U.S. PATENT DOCUMENTS

| | | |
|---|---|---|
| 2007/0290575 A1 | 12/2007 | Nayar et al. |
| 2012/0147921 A1 | 6/2012 | Conti et al. |
| 2013/0083819 A1 | 4/2013 | Koeck et al. |
| 2014/0023758 A1 | 1/2014 | Taylor |
| 2014/0342107 A1 | 11/2014 | Frommelt et al. |

* cited by examiner (STATE OF THE ART)

(STATE OF THE ART)

ULTRASOUND SYSTEM FOR METALS AND THEIR ALLOYS PROCESSING AND METHOD OF LIQUID METALS AND THEIR ALLOYS PROCESSING

This application is a national phase entry of International Patent Application No. PCT/IB2021/057402, filed Aug. 11, 2021, which claims priority from Polish Patent Application No. PL434866 filed Aug. 12, 2020, the entire disclosures of which are incorporated herein by reference.

RELATED APPLICATIONS

The subject of the invention is an ultrasound system for processing of liquid metals and their alloys, in particular in a system, in which they are atomized by subjecting them to an action of an vibrating waveguide which serves a function of a sonotrode. The subject of the invention is also a processing method of liquid metals and their alloys.

BACKGROUND OF THE INVENTION

In the state-of-the-art, for liquid metals processing vibrations with ultrasound frequency are used. Typical applications include powders atomization, degasification and alloying of metals and their alloys. Typically, the ultrasound system is excited by a piezoelectric or a magnetostrictive transducer. Due to the fact that the upper operating temperature of those transducers is far more lower than a melting point of the majority of metals, the ultrasound system requires applying high-efficiency cooling or moving away the transducer from a heat source.

In order to the ultrasound liquid metal processing occurs in a stable manner, it is required to maintain a temperature of a sonotrode surface above the melting temperature of the alloy, otherwise the crystallization of the alloy progresses on its surface. Due to the limited operating temperature of the piezoelectric transducer, it generates a high thermal gradient, which translates into a low life-span of the sonotrode. At the same time, due to material limitations and fatigue (millions of cycle below one minute), this limits the maximum operating temperature of the uncooled sonotrode of metallic materials to about 1000 K.

A significant problem in all applications using ultrasounds at high temperature is selecting a material, which is able to transfer vibrations with high intensity without its destruction. The natural candidates for the waveguides operating at high temperature are high-melting metals and engineering ceramics.

Refractory metals melting at temperature above 1000 K lose significantly on strength. This decrease is particularly strong after exceeding ½ of homologous temperature (operating temperature to melting temperature). For example, the alloy Ti6Al4V (ASTM grade 5) at a room temperature reaches even 600 MPa of fatigue strength, and above 1073 K this strength decreases below 100 MPa. Similarly, in the case of tungsten sinters (Densimet), which reaches even up to 400 MPa of fatigue strength, and at 1573 K this strength decrease below 20 MPa.

Engineering ceramics, including graphite, silicon nitride, silicon carbide, materials SiAlON type are brittle and they have low tensile strength. Solutions known from the state-of-the-art and industrial practice (Constellium's R&D on the Use of Power Ultrasound in Liquid Aluminium: An Overview Philippe Jarry and Jean-Louis Achard) only allow for transferring low vibration amplitude, and their wider application is limited by hard to predict process of ceramics cracking under the influence of ultrasounds.

As the closest prior art to the present invention, documents describing using the refractory metals and engineering ceramics for the waveguides operating at high temperatures should be indicated, as far as none of the documents available in the state-of-the-art indicate fibrous composites with ceramic or metallic matrices and with a ceramic or metallic reinforcement as materials possible to be used in ultrasound systems of high power, neither they do not indicate essential orientation of the waveguide and the fibers for the proper operation of the system.

There is a lack of consistency in definitions of composite materials. In this description a definition from A. Boczkowska, J. Kapuściński, Kompozyty, WPW, Warszawa 2000 is adopted. A composite, also known as a composite material is a material which meets following cumulative conditions: it is composed of at least two phases of different properties, which are connected so that it has new properties in relation to the components taken separately or resulting from a simple summation of their properties. Those phases are sometimes assigned names corresponding to their mechanical functions and one of the phase is described as a matrix, whereas a second as a reinforcement. A particular form of the composite described in the application is a fibrous composite, whose reinforcement constitutes a fibrous material i.e. the material formed in the way, that one of its dimension is many times larger than the others.

The U.S. Pat. No. 3,599,319 describes using of the waveguide made of graphite and transmitting longitudinal vibrations. The waveguide with an amplitude multiplication is glued to the metallic element due to the technological difficulties in the connection of the graphite with the ultrasound transducer. In the indicated application, the intensity of the vibrations is limited by the low strength of the graphite and the strength of the glued connection.

The U.S. Pat. No. 4,798,332 describes a metallic waveguide placed orthogonally serving for atomization of liquid metals. This solution is successfully used in a case of the low melting point materials, however due to a lack of materials with high strength at the temperature above the melting temperature of the aluminum alloys limits its use at a broader scale.

The Chinese patent document CN110512070 describes orthogonally placed ceramic waveguide serving for liquid metals processing. This solution can be used only at low intensity of ultrasounds due to the brittleness of monolithic ceramics.

The Soviet patent document SU1715501A1 describes a waveguide with the orthogonal tip, serving for atomization of liquid metals and their alloys. This solution cannot be used at temperature exceeding melting temperature of the aluminum alloys due to the indicated above low strength of the metallic material at this temperature.

The European patent document EP0842018 describes a rotatable sonotrode serving for a cutting, made of a metallic disc compressed between a transducer and an additional waveguide. This solution cannot be used at high temperature due to low strength of metallic materials.

The Japanese patent document JP6074583 describes a waveguide made of a metallic material in a form of a wire, the solution is dedicated also for atomization. Using the metallic material limits the maximal operating temperature of this solution.

The U.S. Pat. No. 7,744,729 presents a sonotrode with a ceramic tip, in which the longitudinal vibrations are excited, which is dedicated to work with liquid metals. Small size of the ending and brittleness of the monolithic ceramics limits application of this solution.

The European patent document EP2731742 describes a plate of a glass-ceramic composite excited by a pneumatic vibrator below ultrasound frequencies i.e. 100 Hz to 20000 Hz, while ultrasound frequencies are commonly recognized from 20000 Hz. Moreover, a composite is loaded along the fibers axes and with a low amplitude so that it cannot be treated as working in conditions of fatigue loading. The matrix of materials of oxide ceramics has to provide a low wettability by liquid aluminum, what is advantageous e.g. during a filtration of a liquid aluminum, but it is not in favor of the other applications e.g. atomization of metals.

As it is shown in literature "Murčinková, Zuzana, et al. Damping properties of fibre composite and conventional materials measured by free damped vibration response. Advances in Mechanical Engineering 11.5 (2019): 1687814019847009", in case of composites ceramics-ceramics, an interaction between a fiber and a matrix results in an increase of a damping coefficient. Similarly, in a case of composite materials with metallic matrix "Gu, Jinhai, et al. The damping capacity of aluminum matrix composites reinforced with coated carbon fibers. Materials Letters 58.25 (2004): 3170-3174." and "Botelho, E. C., et al. Damping behavior of continuous fiber/metal composite materials by the free vibration method. composites part B: Engineering 37.2-3 (2005): 255-263.", an interaction between a fiber and a matrix substantially increase the damping coefficient. As it was shown, also in a case of the carbon-carbon composites "Vaidya, U. K., P. K. Raju, and W. Kowbel. "Material damping studies on carbon-carbon composites." Carbon 30.6 (1992): 925-929.", the high damping coefficient excludes the use of those materials for sonotrodes, and vibrations result in cracking of the matrix and loosing of a cohesion of the composite. Due to that fact it is generally agreed that composite materials are not used for manufacturing vibrating waveguides for liquid metals processing.

The publication "Eskin, Dmitry G., K. Al-Helal, and Iakovos Tzanakis. Application of a plate sonotrode to ultrasonic degassing of aluminum melt: acoustic measurements and feasibility study. Journal of Materials Processing Technology 222 (2015): 148-154" describes a solution close to the present invention, concerning on using a plate sonotrode made of a solid alloy Ti6Al4V for ultrasound processing of liquid aluminum alloy. Using of the metallic material substantially limits the possibility of using it at higher temperatures and possible amplitude to be transmitted.

As other relevant patent documents, relevant for the state-of-the-art, describing waveguides dedicated to operating at high temperature, methods of cooling them and materials which they are made of, it should be listed: US2004124745, CN110666183, CN209792610, CN110465672, EP2832456, GB952042, EP0689774, JPS59189042, CN1422718, DE2656330, U.S. Pat. Nos. 2,889,580, 3,275,787, 3,833,163, US2012216576, GB1594977, U.S. Pat. No. 3,682,459, JP2002096024, CN106835006, CN102935742, CN201305623, CN102554195, U.S. Pat. No. 8,844,897, JP2011177787, CN104384483, JP5570883, JPH04305279, US376236, CN106795583, CN201713563, JPH09220661, JPH02121830, JPH05427, JP2011051007, CH707125, JPS5925904A, WO2012148714, JP2003138303, EP1238715, EP0434980, JPS59211571, KR101764289, CN107138733, JPH01191707, U.S. Pat. No. 5,198,157, CN105855558, CN107900364, CN202169374, U.S. Pat. No. 4,981,425, EP1238715, CN103433499, U.S. Pat. No. 4,473,187A, GB1150506, U.S. Pat. Nos. 2,488,353A, 2,889,580, DE3032785, CN101332513, CN102935742, U.S. Pat. No. 7,820,249, JPH0911199, JPH09294744, CN107848024, CN102554195, CN110421178, CN110395739, CN110303162, CN209407418, CN209407418, CN110076346, CN109622982, EP1245315, JPH0949007, JPH0949007, RU2714001, CN209849886, CN20984988, CN110355377, CN110666183, WO2020006062, CN109967752, CN109622980, CN107876787, CN204504226, U.S. Pat. Nos. 4,798,332, 4,412,505, 4,473,187, 4,402,458, 4,799,622, DE2137083, SU695691, U.S. Pat. No. 6,247,525, JPH08100205, CN201832965, CN105855487, CN109622906, SU850301, CN2776571, CN201538802, CN107306372, U.S. Pat. No. 4,307,128, CN201208649, CN105665730, WO2008080888, U.S. Pat. Nos. 5,653,346, 5,171,387, SU1715500A1, SU1715501A1, SU1715502A1, JPH02212097, U.S. Pat. No. 6,058,823, GB2282559, U.S. Pat. No. 6,497,164, GB2248795, GB2270025, GB2325192, DE10353804, JPH07132493, WO2017154113, JP2007307632, CN101966661, CN103071613, CN104550875, U.S. Pat. No. 8,459,122B2, JPH11128836, WO2018168288, JP2004033948, U.S. Pat. Nos. 10,233,515, 2,820,263, 3,193,889, 3,459,255, 4,287,755, 5,355,935, 4,662,427, 3,193,889, 3,363,668, 3,599,319, 3,363,668, DE602004004488T2, EP1250972, U.S. Pat. No. 9,481,031B2, DE3106711, SU695691A1, RU2577582C1, WO03068412, U.S. Pat. No. 8,610,334.

BRIEF SUMMARY OF THE INVENTION

The objective of the invention is to overcome above described limitations of high-melting metals and engineer ceramics and providing a reliable ultrasound system suitable for operating at high temperature required for melting of metals and simultaneously resistant to fatigue of material resulting from continuous vibrations at this temperature.

According to the invention, an ultrasound system for liquid metal and their alloys processing is provided, comprising at least one ultrasound transducer and at least one composite waveguide made of a composite material comprising a reinforcement and a matrix. The ultrasound transducer is coupled with the composite waveguide so that during work it excites a standing wave of mechanical vibrations in the composite waveguide. The matrix comprises a metallic and/or ceramic material, whereas the reinforcement comprises fibers of metallic and/or ceramic material. The ultrasound transducer is coupled with the composite waveguide so that it excites mechanical vibrations in the composite material transverse to fibers of the reinforcement material. Fibrous composite materials are characterized with a high mechanical loss in a high frequency range, and thus they are not recognized by experts in the field as materials suitable for use in ultrasound elements. It results from a huge difference in modules of the fiber and the matrix and losses connected with the transmission between an interphase boundary. Due to a high damping resulting from an interaction between the fiber and the matrix, the persons skilled in art routinely forego the use of composites for manufacturing of sonotrodes. The ultrasound system with the composite waveguide according to the invention is also characterized by relatively high loss, but thanks to the high resistance to fracture and using materials with high thermal resistance both for the matrix and for the reinforcement, it can be used in earlier unachievable environments at an expense of a higher loss power—dissipated during an elastic strain during the work. Unexpectedly it turned out that an acceptable damping level and simultaneously the fatigue resistance during work at high temperatures was possible to be achieved when the orientation of mechanical vibration were transverse to the fibers. Above mentioned composite waveguide with dimensions of 20×100 mm and a thickness of 2 mm made of a carbon fiber in a matric of a silicon carbide maintained cohesion in vacuum up to temperature of 2000° C. at the change of power dissipated to internal friction by no more than 10%.

During experiments it turned out that by using a composite comprising both the matrix and the fibrous reinforcement in the form of materials with high thermal resistance, after setting a loading resulting from the vibrations transversely to the fibers of the reinforcement, it was possible to obtain both the resistance to fatigue at high temperatures exceeding possibilities of waveguides of solid materials and permissible damping of vibrations allowing use in operation e.g. in atomization of liquid materials and their alloys.

Advantageously the matrix comprises a ceramic material. In those solutions a high resistance to temperature was obtained, however at an expense of a low wettability. The materials chosen from a group comprising carbon, silicon carbide and mixtures thereof turned out to be particularly advantageous ceramic materials. The matrix on the basis of the carbon or silicon carbide is characterized by the low wettability by a majority of non-carbide forming metals and their alloys by what it ideally suits for using in their processing during prolonged exposition during liquid metal processing, e.g. by degasification of liquid aluminum, or homogenization of ceramics-metal composites, however it does not suit for ultrasound atomization, when the wettability of the waveguide surface is a determining factor of correctness of a process.

The composite waveguide is advantageously covered with a metallic coating or with a diffusive metallic layer comprising at least one metal or metal alloy chosen from a group comprising titanium, niobium, tantalum, rhenium, tungsten, molybdenum and iridium. Using of metallic coatings allows for increasing wettability of the waveguide to liquid metals, what is critical in a case of ultrasound atomization. Metallic materials are well wettable by other liquid metals and simultaneously because of a low solvency of high-melting metals in other metals and their alloys, a high lifetime of the system by dissolution of the coating can be achieved. A particularly advantageous system is achieved for the systems in which no formation of solid solutions e.g. W—Cu or Fe—Mg occurs, because a coating does not dissolve.

A particularly advantageous connection is using a matrix or a coating comprising a metallic material and a reinforcement comprising a fibrous ceramic material. Such connection make a use of a high wettability of the metallic material being in a direct contact with a processed material and with a high strength of ceramic fibers at high temperatures, what translates into long lifetime in ultrasound atomization processes. A metallic matrix allowes for obtaining high wettability without additional coatings and ceramic fibers increase a range of temperatures, at which a sufficient resistance to material fatigue is obtained.

Advantageously the matrix comprises a metallic material whereas the reinforcement comprises a ceramic material. In such configuration a compromise between wettability and a range of used temperatures even without additional coatings is obtained.

Advantageously, the reinforcement comprises a fibrous material chosen from a group comprising carbon, and silicon carbide and mixtures thereof. Also in a fibrous material of the reinforcement, using of those materials was translated into the higher range of temperatures, both in combination of the metallic matrix and the ceramic matrix as well. Particularly advantageous reinforcement material are fibers of carbon or silicon carbide or mixtures thereof. The strength of those fibers is maintained even up to temperature of 2000° C., and in a case of certain compositions it even increases, so that an effective ultrasound metal and their alloys processing on a basis of iron, cobalt, nickel or platinum is possible. Moreover, using carbide fibers advantageously limits a diffusion of carbon inside the metallic matrix, in particular in a case of their carbide-forming properties. Additionally, a connection of above mentioned fibers with a matrix can be optimized in a standard way by application of additional coatings and layers on them.

Advantageously, the matrix material comprises a metal or metal alloys chosen from a group comprising titanium, niobium, tantalum, rhenium, tungsten, molybdenum and iridium. Using of those metals provided both wettability and thermal resistance. Above mentioned group of metals is characterized with a high melting temperature and a relatively low solubility in other metals, thanks to what it is the matrix material, which provides cohesion of the composite at high temperatures and simultaneously it provides a high lifetime in a context of matrix manufacturing.

The composite waveguide is advantageously covered with a protective coating or a ceramic layer, in particular comprising a material chosen from a group comprising pyrolytic carbon, silicon carbide and vitreous carbon, additionally increasing the resistance to high temperatures. Above mentioned materials provide also high resistance to cavitation in an environment of liquid metals thanks to what they increase composite waveguide lifetime in applications, which do not require a high wettability of a surface, e.g. during aluminum alloys degasification or manufacturing metal-ceramics composites.

Advantageously, the ultrasound transducer is coupled with the composite waveguide by means of an additional metallic waveguide. Such configuration enables excitation of transverse vibration. Additionally the metallic waveguide allows for increasing a distance between a transducer, which operating temperature shall not normally be higher than 340K and the composite waveguide, which is exposed to temperatures many times higher. The length of the additional waveguide should be selected in such way, that its longitudinal resonance frequency does not deviate from the acceptable operating frequency of the ultrasound transducer.

Advantageously the ultrasound system is provided with a second metallic waveguide, whereas the composite waveguide is coupled with the ultrasound transducer so that it is located between the ultrasound transducer and the second metallic waveguide, wherein the ultrasound transducer is coupled with the second metallic transducer by means of threaded connector. Seating of the fibrous waveguide between two vibrating elements allows for a stable transmission of the vibrations to the composite waveguide and to provide uniform pressure of the composite waveguide to the transducer or to the intermediate waveguide. The composite waveguide in such system creates a plate pressed by the transducer and the waveguide. That is a very convenient configuration in many solutions, in particular in atomization. Moreover, the pressure by means of the second metallic waveguide eliminates a necessity of using unreliable threated connections in the composite waveguide as well as non-separable glued connections.

Advantageously the ultrasound system is provided with the second metallic waveguide, whereas the composite waveguide is coupled with the ultrasound transducer such that it is located between the ultrasound transducer and the second metallic waveguide, wherein the ultrasound transducer is coupled with the metallic waveguide by means of the threaded connector. The additional metallic waveguide facilitates a mechanical fastening and coupling of the composite waveguide with the transducer in order to maximize the amplitude of the transverse vibrations. Particularly advantageous is a configuration with two metallic waveguides, because it is possible to give them shape which facilitates mounting the composite waveguide between them. Locating the composite waveguide between two waveguides enables, by selecting their length, providing vibration maximum at their excitation place in a composite waveguide while simultaneous determining a direction of vibrations transversally to the fibers. The configuration is particular advantageous, when the reinforcement material is ceramic, because it allows for avoid threading of an opening in the composite waveguide. Threading is troublesome in composite material with ceramic fibers. Such configuration allows also for fast quick replacing of the composite waveguide in case of wearing and for providing repetitive pressure measuring a torque on the threaded connector, while simultaneous moving away of thermal delicate transducer from a heat source.

Advantageously, the composite waveguide is coupled with more than one ultrasound transducer, wherein the ultrasound transducers are located at a distance equal to a multiple of a length between antinodes of the standing wave in the composite waveguide during the system operation. It allows for increasing of the vibration amplitude at high frequencies and to use unexpansive, widely available transducers having low power.

Advantageously the composite waveguide is bent and the reinforcement fibers maintain continuity at bending place. It enables to match the system to the application, as well as to limit the dimensions without losing the benefits resulting from the use of fibrous material. The composite waveguide in such case consists of an orthogonal part connected to the ultrasound transducer and a non-orthogonal part connected to the to the orthogonal part in such way, that in the non-orthogonal part a transverse wave is excited and the composite fibers maintain continuity between the orthogonal part and the non-orthogonal part of the waveguide. A critical operating condition of a composite waveguide is exciting a transverse wave instead of longitudinal one. In the solution according to the invention it is achieved by orthogonal location of the transducer in relation to the composite waveguide. The composite waveguide itself and excited by the transverse wave can be subjected to modifications in such way, that its distal parts will not be orthogonal to the axis of the transducer, and thanks to the orthogonal part being connected directly to the transducer and maintaining the composite fibers continuity between the parts, a transverse wave is to be excited therein. Consequently waveguide can be redirected, without exciting disadvantageous longitudinal wave and thus it can be successfully used it in applications in which a specific geometry of the waveguide is required, e.g. during directing a liquid stream or during exciting of the pipes of composite.

The composite waveguide advantageously has a periodic structure of the reinforcement fibers of variable distance from the neutral surface of the standing wave during operation and distributed so that during the system operation, the fibers are located farther from the neutral surface and closer to the outer surface of the waveguide, in the neighborhood of the antinodes of the standing wave than in the neighborhood of the nodes of the standing wave. Such configuration allows for local increasing of the strength of the waveguide in places which are most susceptible to damages. The neutral surface in particular mode of the standing wave of the waveguide should be understood as a surface, which comprises the points of the waveguide, at which no normal stress occurs, at a moment when the waveguide has a zero momentum so amplitude achieves maximum (maximum on a diagram of displacement of a waveguide point in a function of a time, which usually take a form of sinus function). In certain structures it is difficult to define a neutral axis or surface, and when exciting simultaneously multiple modes this concept may lose physical sense.

A method of metal processing comprising liquid metals and their alloys according to the invention is characterized in that the metal is melted and the melted metal is subjected to the operating of a vibrating waveguide in a ultrasound system, by means of the ultrasound system according to the invention. It allows for increasing the maximum temperature of liquid metal processing with simultaneous applying a high amplitude, in particular during alloying of the liquid metals and their atomization. The method according to the invention applying the ultrasound system according to the invention allows for working at parameters unavailable by any other homogenous materials i.e. above total 20 kHz, 15 μm of amplitude and 1300° C.

BRIEF DESCRIPTION OF THE DRAWINGS

Embodiments of the present invention are explained below with reference to attached drawings, in which.

DETAILED DESCRIPTION OF THE INVENTION

Figure 1A:
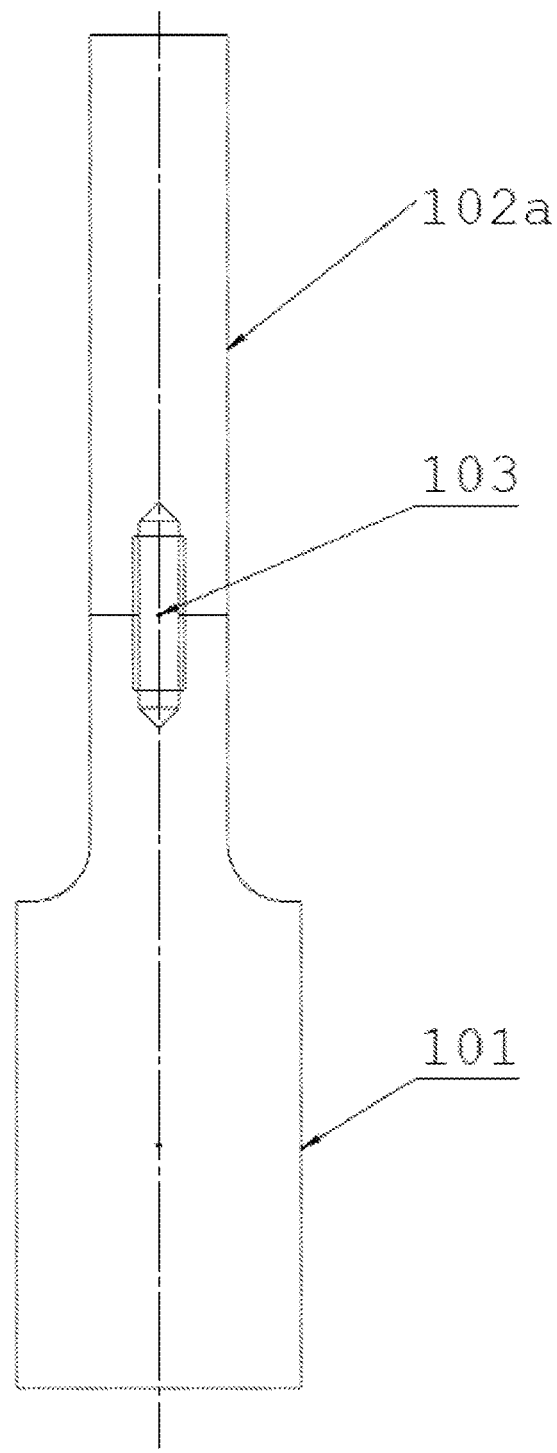
FIG. 1a presents the waveguide according to the state-of-the-art located parallel to the axis of the transducer.

The ultrasound system known from the state-of-the-art with the transducer 101 connected to the waveguide 102a by a threaded connector 103, where the axis of the waveguide is coaxial to the axis of the transducer was presented in FIG. 1a. The longitudinal wave is excited in a waveguide 102a.

Figure 1B:
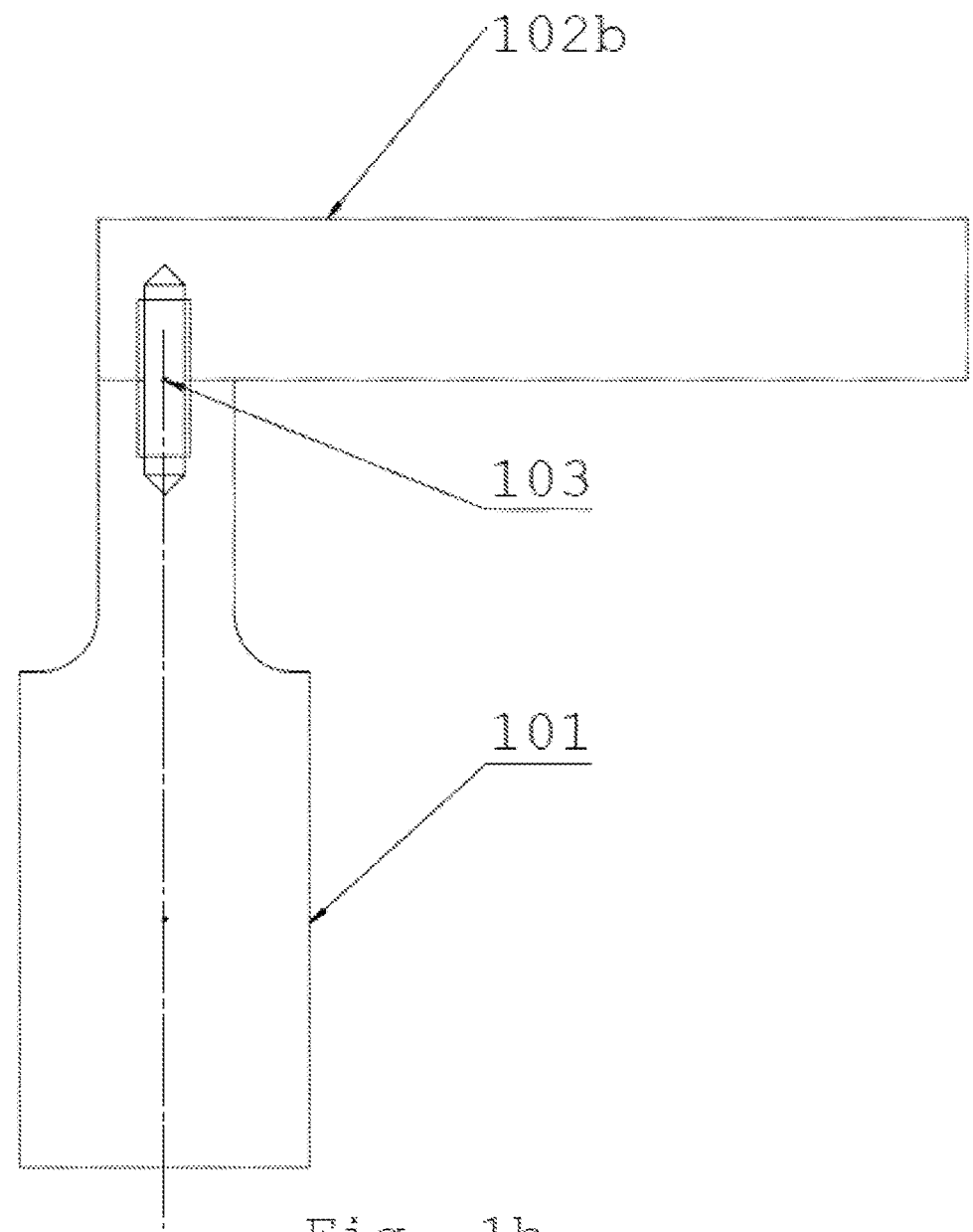
FIG. 1b presents the waveguide according to the state-of-the-art located orthogonally to the axis of the transducer.

The ultrasound system known from the state-of-the-art with the transducer 101 connected to the waveguide 102b by a threaded connector 103, where the waveguide axis is orthogonal to the axis of the transducer was presented in FIG. 1b. The transverse wave is excited in a waveguide 102b.

Figure 2:
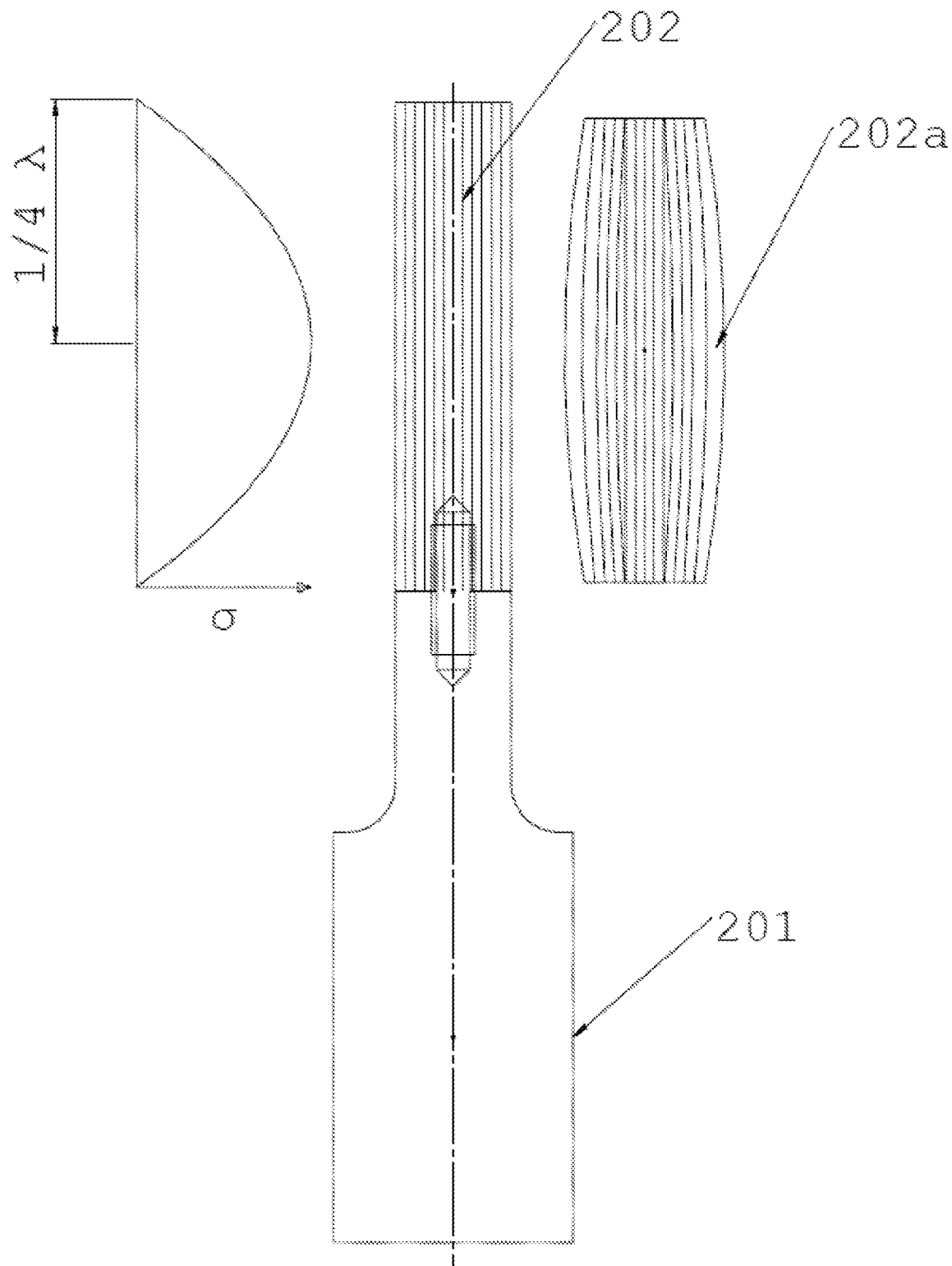
FIG. 2 presents a way of destruction of the composite waveguide with fibers longitudinally loaded.

FIG. 2 presents a composite waveguide in a form of a cylinder 202 parallel to the axis of the transducer 201 made of the fibrous composite with marked distribution of fibers, and the same composite waveguide 202a deformed by longitudinal vibrations and stress distribution (σ) in the waveguide with a distance from the front of the waveguide to the wave node (¼λ) indicated. It is worth noting, that load of that type is disadvantageous for most of fibrous composites, by which the ultrasound system with the transducer and the waveguide coaxially arranged is not able to transmit high amplitudes of the vibrations.

Figure 3:
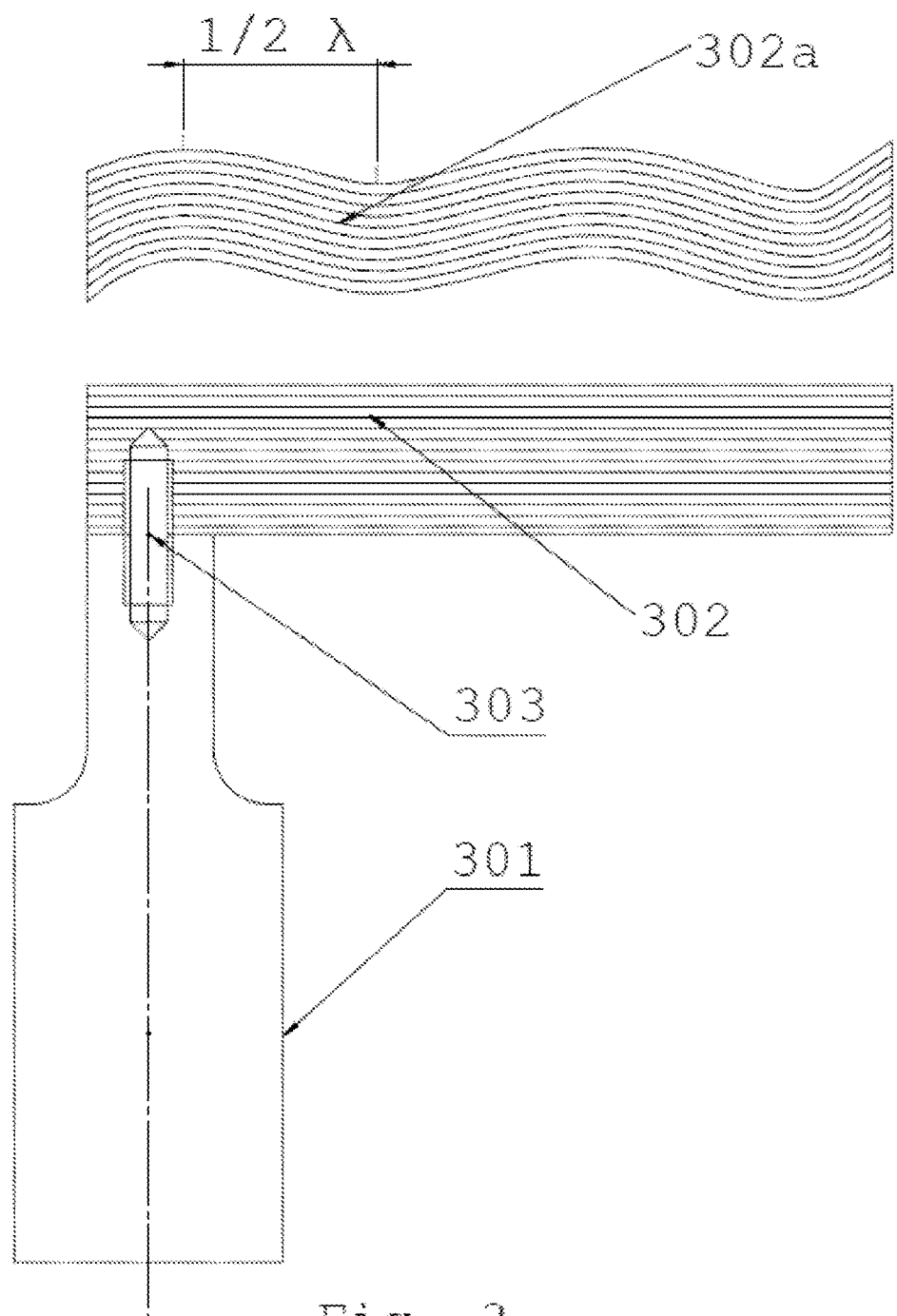
FIG. 3 presents the ultrasound system according to the invention according to the first embodiment.

FIG. 3 presents the ultrasound system according to the first embodiment. The piezoelectric transducer 301 with a capacitance of 11.9 nF, with ceramics PZT 8 and a nominal operating frequency 20 kHz is connected to a flat, plate, with a thickness of 15 mm, with a width of 90 mm and with a length of 200 mm, made of the composite carbon-carbon type, composite waveguide 302 made of pyrolysis of the organic precursor and having continuous fiber made of the carbon made by pyrolysis of polyacrylonitrile method, distributed uni-directionally transversely to the axis of the transducer and a graphite constitutes a matrix. The reinforcement of the composite is a carbon fiber, and a matrix of the composite is a carbon in a form of graphite. The deformation of the composite during operation time was schematically presented in drawing with a reference 302a. During the operation time, a transverse wave is excited in a waveguide, wherein a half-wave distance (½λ) is 25 mm. The invention could be realized also with other types of waveguides, e.g. cylindrical waveguides, but flat plate waveguide perform well in metal atomization so such embodiment was selected. The connection of the transducer 301 to the composite waveguide 302 was provided by the connectors 303.

Figure 4:
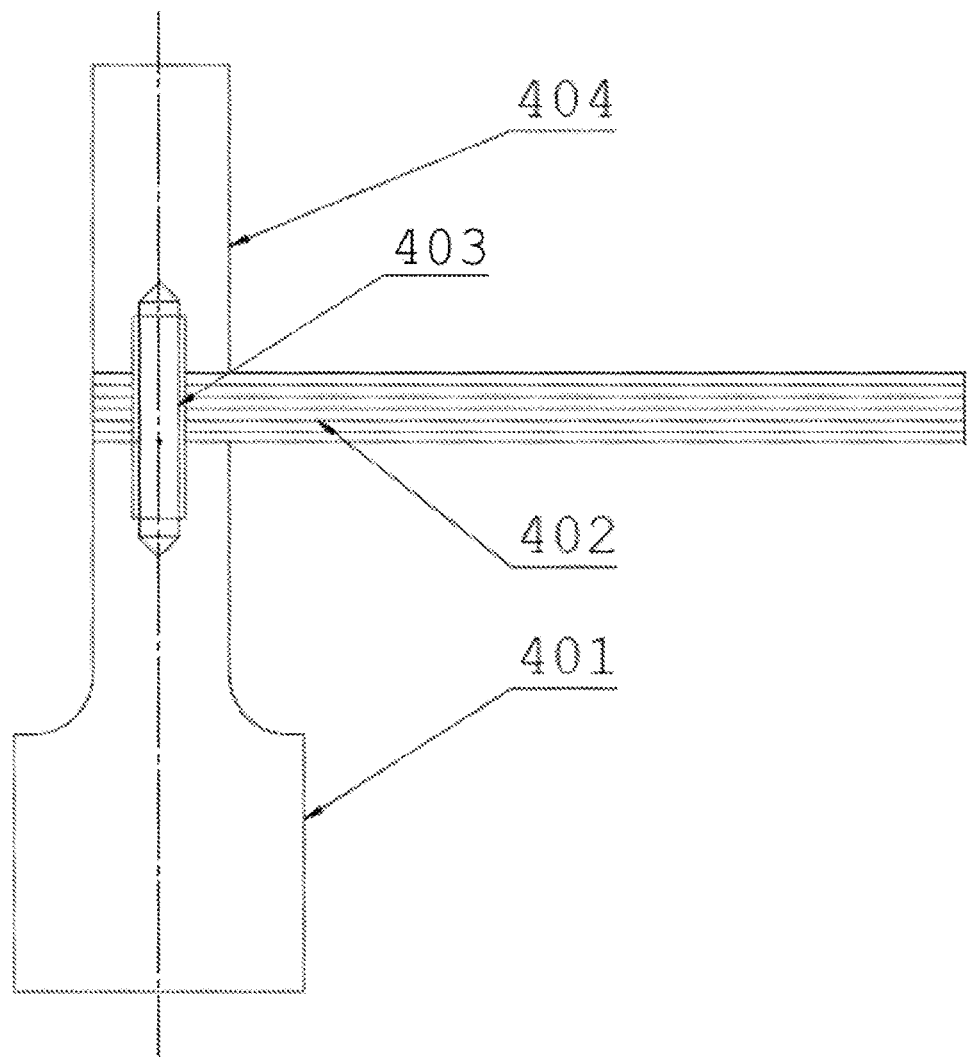
FIG. 4 presents the ultrasound system with the metallic waveguide according to the second embodiment.

FIG. 4 presents the ultrasound system according to the second embodiment. The piezoelectric transducer 401 with a capacitance of 5.8 nF, with ceramics PZT 8 and a nominal operating frequency of 40 kHz is connected to the composite waveguide of carbon-silicon carbide composite, with a thickness of 6 mm, with a width of 20 mm and with a length of 300 mm, made by infiltration of carbon-carbon composite with liquid silicon method, in which the continuous fiber made of the carbon is distributed uni-directionally transversally to the axis of the transducer and the silicon carbide constitutes a matrix. Transducer 401 is connected to the metallic waveguide 404 with a length of 62 mm made of Ti6Al4V alloy with a diameter of 20 mm. Using of the metallic waveguide 404, which presses the composite waveguide 402 to the transducer 401 allows for maintaining the a uniform distribution at the interface transducer 401—composite waveguide 402. Using of such configuration allows for effective exciting of the transverse wave even when the threaded connector of the composite waveguide and the transducer turns out to be insufficiently strong because the threaded connector 403 cooperates with the waveguide 404 made of metal, what is advantageous for the connection by means of the threaded connectors 403.

Figure 5:
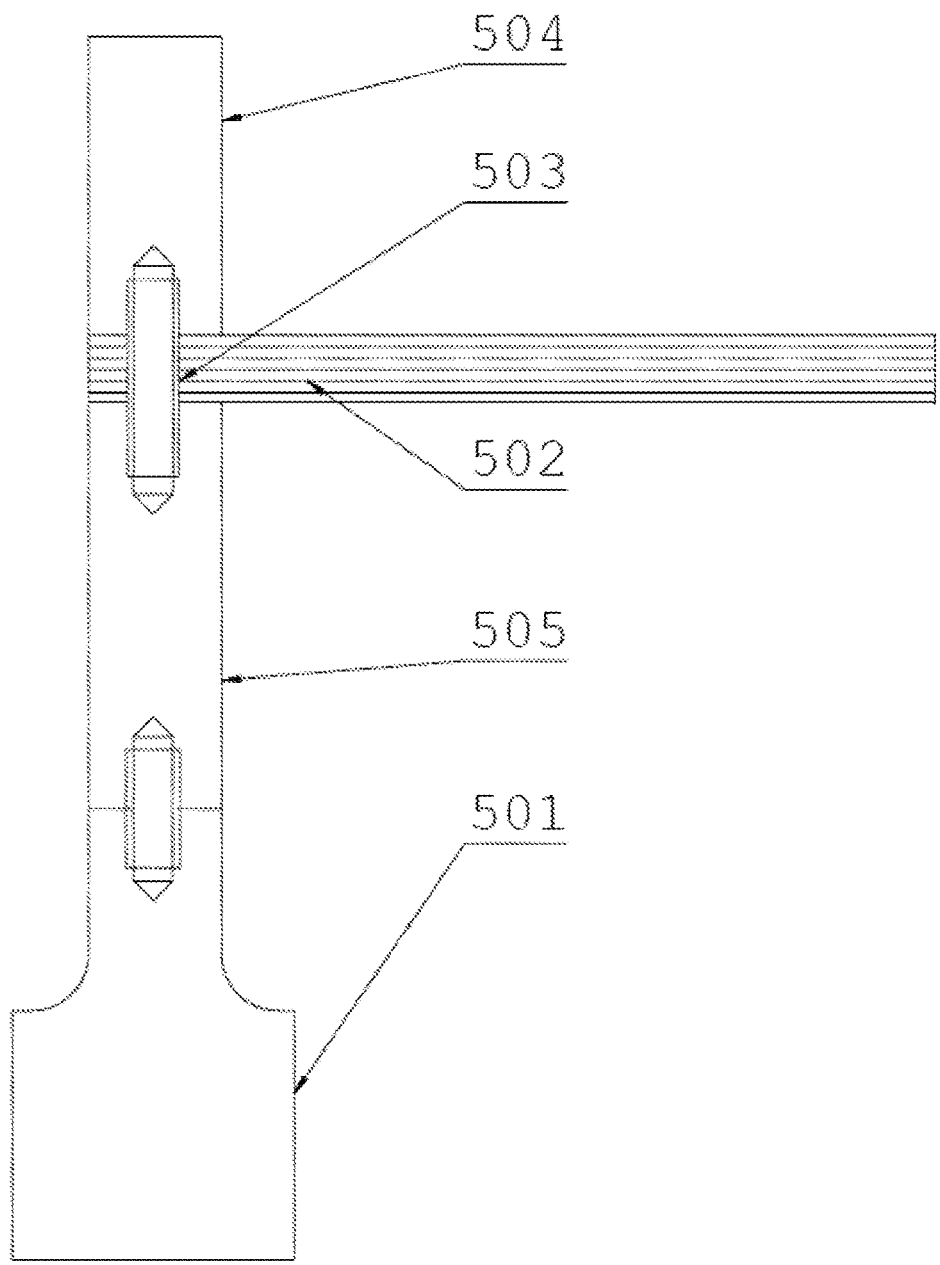
FIG. 5 presents a general scheme of the ultrasound system provided with the intermediate waveguide, the composite waveguide arranged orthogonally to the transducer and the additional metallic waveguide arranged in parallel to the transducer

FIG. 5 presents a general scheme of the ultrasound system according to the third, fourth, fifth and sixth embodiment.

In the third embodiment, the piezoelectric transducer 501, with a capacitance of 5.8 nF, with PZT 8 ceramics and a nominal operating frequency of 40 kHz is connected to the waveguide made of composite silicon carbide—silicon carbide with a thickness of 2 mm, with a width of 20 mm and length of 150 mm, made by infiltration from the gas phase of the preform of silicon carbide method, in which the continuous fiber made of the silicon carbide with a diameter of 140 μm and distributed uni-directionally transversally to the axis of the transducer and the silicon carbide constitutes a matrix. A fiber of the silicon carbide is the reinforcement of the composite, and the silicon carbide is the matrix. The metallic waveguide 504 with a length of 62 mm made of Ti6Al4V alloy with a diameter of 20 mm is connected by a threaded connector 503 with an additional metallic waveguide 505 made of Ti6Al4V alloy with a length of 62 mm. The composite waveguide 502 is located between the metallic waveguide 504 and the additional metallic waveguide 505. The additional metallic waveguide is connected to the ultrasound transducer 501.

In the fourth embodiment, the piezoelectric transducer 501 with a capacitance of 5.8 nF, with PZT 8 ceramics and a nominal operating frequency 40 kHz is connected to the waveguide of the composite silicon carbide-silicon carbide with a thickness of 2 mm and a width of 30 mm and a length of 400 mm, made by infiltration from the gas phase of the preform of the silicon carbide method, in which the continuous fiber made of silicon carbide is woven in satin weave fabric and oriented perpendicular to the axis of the transducer and the matrix constitutes a silicon carbide, and the composite waveguide is covered with a coating of the metallic rhenium, with a thickness of 5 μm, obtained by chemical vapour deposition using organic precursors (MO-CVD) method. A fiber of the silicon carbon is the composite reinforcement and the silicon carbide is the matrix, and a coating constitutes a metallic rhenium. The metallic waveguide 504 with a length of 56 mm made of Ti6Al4V alloy with a diameter of 20 mm is connected to the additional metallic waveguide 505 made of Ti6Al4V alloy with a length of 62 mm with a threaded connector 503. The composite waveguide 502 is located between the metallic waveguide 504 and the additional metallic waveguide 505. The additional metallic waveguide is connected to the ultrasound transducer 501.

In fifth embodiment, the piezoelectric transducer 501 with a capacitance of 5.8 nF, with PZT 8 ceramics and a nominal operating frequency 40 kHz is connected to the waveguide of composite niobium-silicon carbide with a thickness of 0.5 mm and with a width of 20 mm and with a length of 180 mm, made by a method of isostatic hot pressing of fibers of silicon carbide in a capsule of niobium with a purity in accordance to ASTM B393 standard at pressure of 200 MPa in a time of 10 ks and a temperature of 1473 K, in which the cut fiber with a length of 15 mm made of the silicon carbide and with a diameter of 140 μm is distributed in a chaotic manner in the plane transverse to the axis of the transducer and a niobium deformed during the isostatic pressing constitutes the matrix. The fiber of the silicon carbide is the reinforcement of the composite, and a metallic niobium is the matrix. The metallic waveguide 504 with a length of 58 mm is made of the Ti6Al4V alloy with a diameter of 20 mm connected by the threaded connector 503 to the additional metallic waveguide 505 made of Ti6Al4V alloy with a length of 124 mm. The composite waveguide 502 is located between the metallic waveguide 504 and the additional metallic waveguide 505.

In the sixth embodiment, the piezoelectric transducer 501 with a capacitance of 5.8 nF, with a PZT 8 ceramics and a nominal operating frequency of 40 kHz is connected to the waveguide of composite niobium-silicon carbide with a thickness of 0.5 mm and a width of 20 mm and a length of 300 mm, made by a method of isostatic hot pressing of fibers of silicon carbide in a capsule of Ti6Al4V alloy at pressure of 200 MPa in time of 10 ks and at temperature of 1073 K, in which the fiber with a diameter of 140 μm, covered with a layer of titanium carbide obtained by a method of physical vapour deposition, is woven in the form of plain weave fabric and is located in a plane transverse to the axis of the transducer and the deformed during isostatic pressure alloy Ti6Al4V constitutes the matrix. The composite waveguide is covered with a layer of rhenium with a thickness of 2 μm obtained by physical vapour deposition (PVD). The fiber of the silicon carbide is the reinforcement of the composite and the Ti6Al4V alloy is the matrix and metallic rhenium constitutes the coating. The metallic waveguide 504 with a length of 41 mm made of CuCrZr alloy with a diameter of 20 mm is connected by a threaded connector 503 to the additional metallic waveguide 505 made of Ti6Al4V alloy with a length of 186 mm. The composite waveguide 502 is located between the metallic waveguide 504 and the additional metallic waveguide 505. The additional metallic waveguide is connected to the ultrasound transducer 501. Using the additional composite waveguide 505 allows for moving away the transducer 501 from the composite waveguide 502 what is advantageous for thermal isolation of the transducer. Additional metallic waveguide 505 may also serve other functions e.g. amplify of the vibration amplitude, or constitutes a place of cooling.

Figure 6:
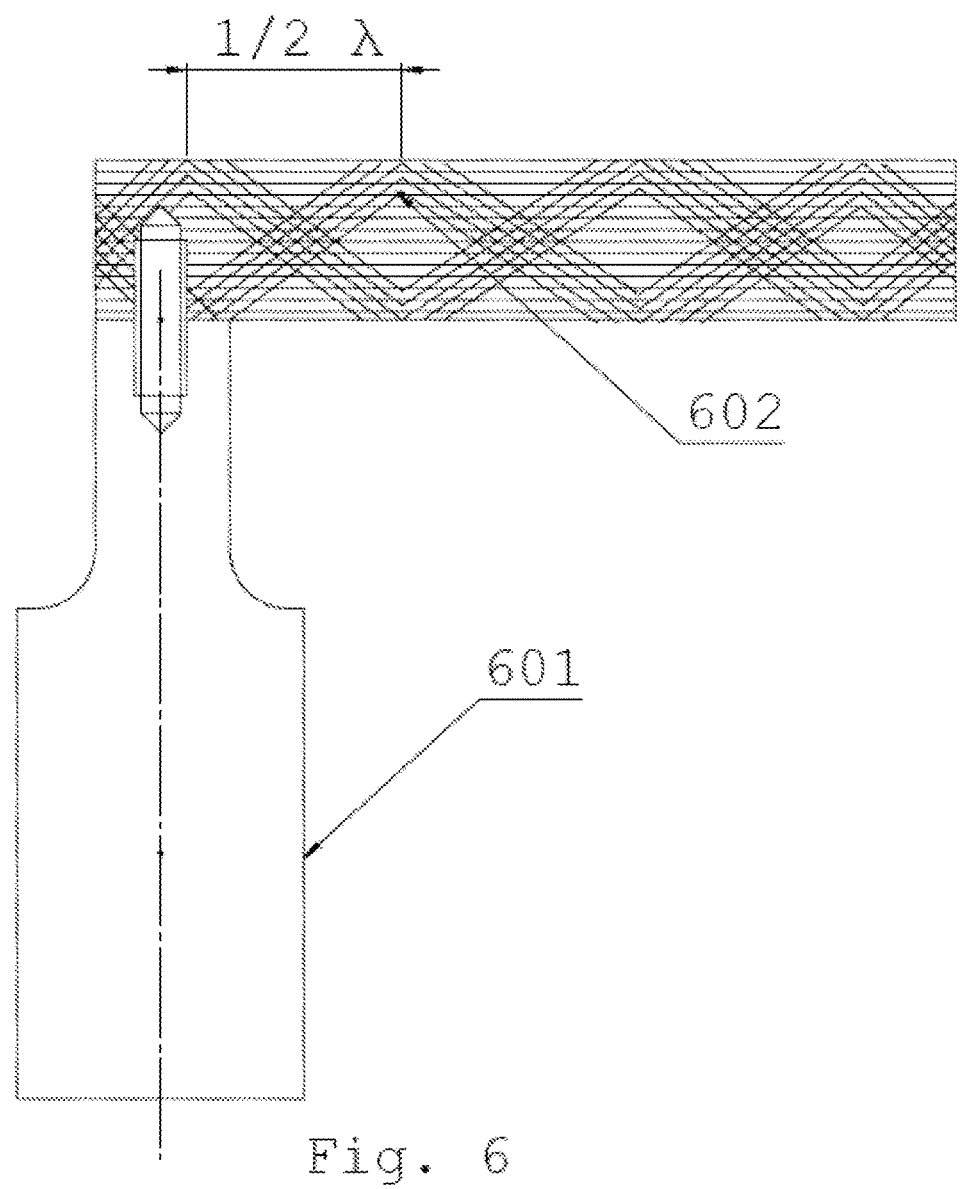
FIG. 6 presents the ultrasound system with the waveguide of fibrous material with interlacing of the fiber according to the seventh embodiment.

FIG. 6 presents the ultrasound system according to the seventh embodiment. The piezoelectric transducer 601 with a capacitance of 11.9 nF, with the PZT 8 ceramics and a nominal operating frequency 20 kHz is connected to the composite waveguide 602 made of carbon-carbon composite with a thickness of 15 mm and a with a width of 40 mm and a length of 200 mm reinforced by the continuous fiber distributed in 80% uni-directionally transverse to the axis of the transducer and in 20% distributed diagonally at an angle of 45 degrees every 25 mm and covered with a coating of a pyrolysed precursor of silicon carbide and 20% of volume of tantalum. The composite reinforcement is carbon fiber, a carbon is the matrix and a silicon carbide with tantalum constitutes the coating. Using of interlacing with periodicity in accordance with distribution of antinodes of the standing wave decreases the risk of delamination of the composite waveguide 602, and using of the metallic particles in the ceramic matrix allows for increasing of its wettability.

Figure 7:
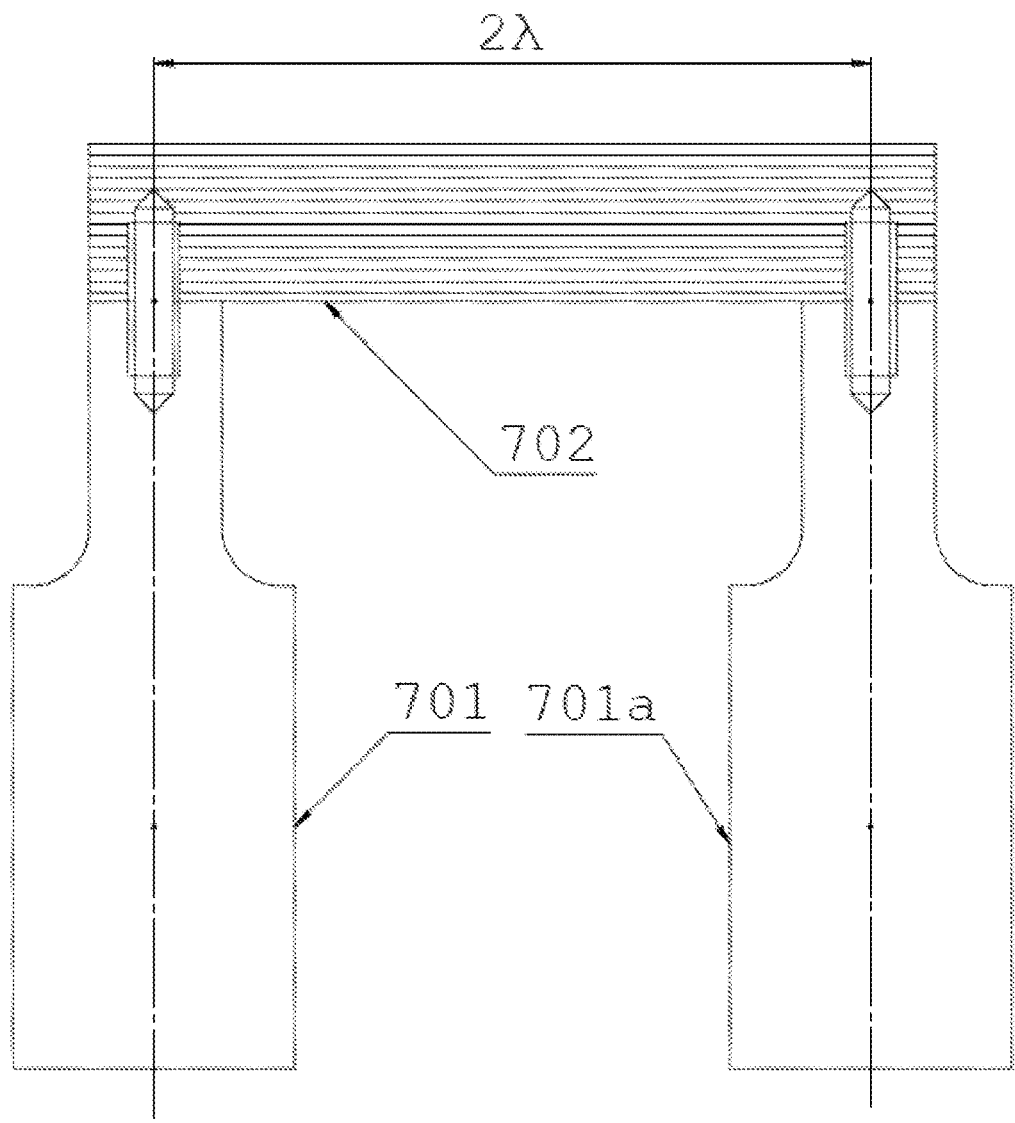
FIG. 7 presents the ultrasound system with two ultrasound transducers according to the eighth embodiment.

FIG. 7 presents the ultrasound system according to the eighth embodiment. Piezoelectric transducers 701 and 701*a* with a capacitance of 11.9 nF, with PZT 8 ceramics and an operating frequency of 20 kHz are connected to the composite waveguide 702 made of carbon-carbon composite with a thickness of 15 mm, reinforced by the continuous fiber orthogonal to the axis of the transducers 701 and 701*a* in such way that the distance between the axes of the transducers is equal to twice the length of the standing wave (2λ-80 mm) in the composite waveguide 702. Using of two transducers allows for achieving a higher amplitude of the vibrations of the waveguide and decreasing the loading of a single piezoelectric transducer.

Figure 8:
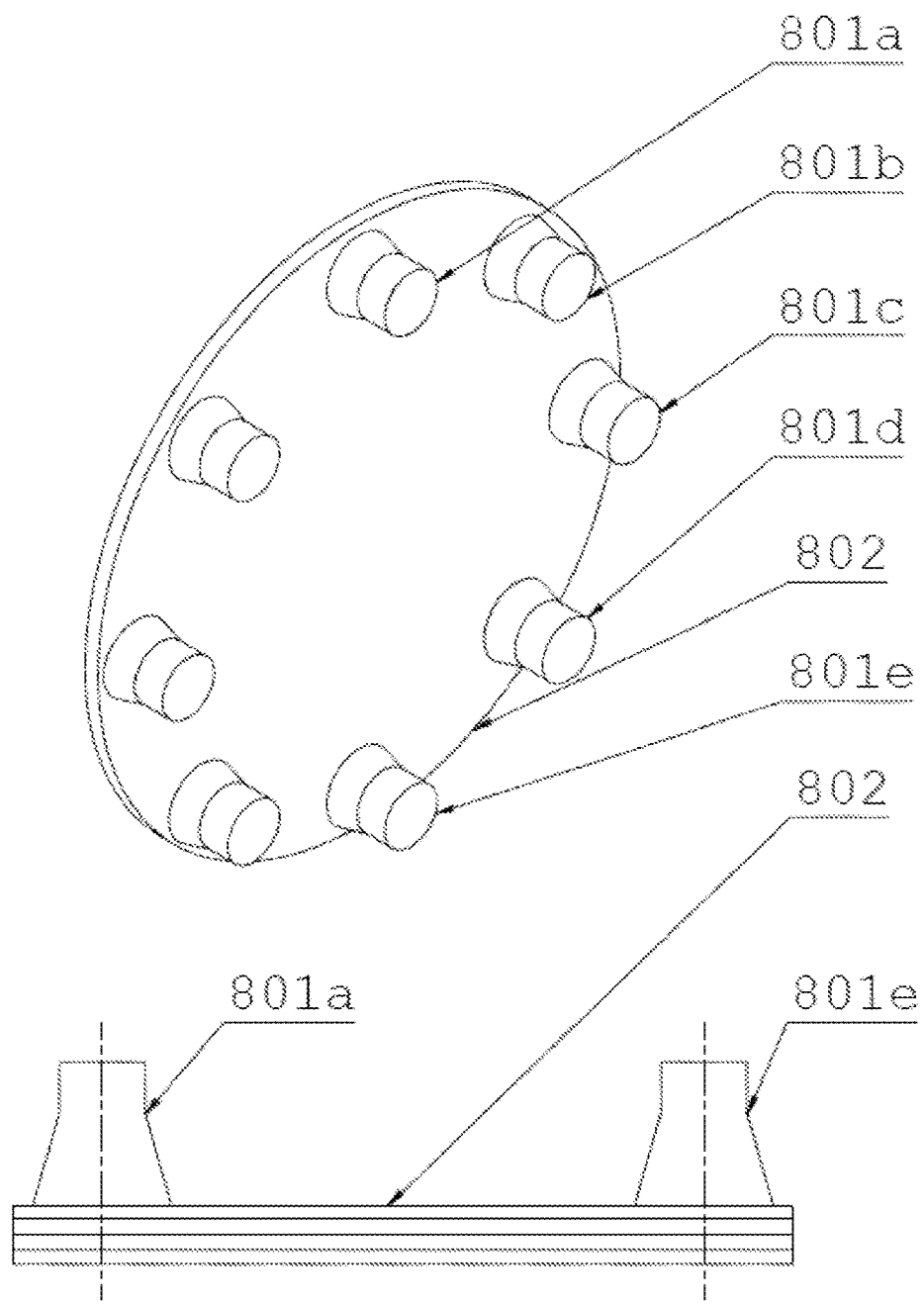
FIG. 8 presents the ultrasound system with eight ultrasound transducers according to the ninth embodiment.

FIG. 8 presents the ultrasound transducer according to the ninth embodiment. The piezoelectric transducers 801*a-e* with a capacitance of 3.6 nF, with PZT 4 ceramics and the operating frequency of 80 kHz are connected by a ceramic glue with the composite waveguide 802 in a form of a disc with a diameter of 200 mm made of the carbon-carbon composite with a width of 5 mm reinforced with a continuous fiber orthogonal to the axes of the transducers 801*a-e* in such way, that the transducers are distributed at the edge of the composite waveguide 802. The fiber of the composite waveguide 802 is orthogonal to the axes of the transducers 801*a-e*, located on the opposite sides of the waveguide in the form of a disc and radiates radially from the middle of the composite waveguide 802. Using many ultrasound transducers allows for increasing the power of the ultrasound transducer at high frequencies.

It is also possible to use the transducers distributed at the distances corresponding to the half of the wavelength, operating in counter-phase. A shape of an envelope of amplitude of vibrations can be shaped if more transducers for wavelength and additional system of phase synchronization will be used. In such configuration it is possible to control the shape of envelope of vibrations.

Figure 9:
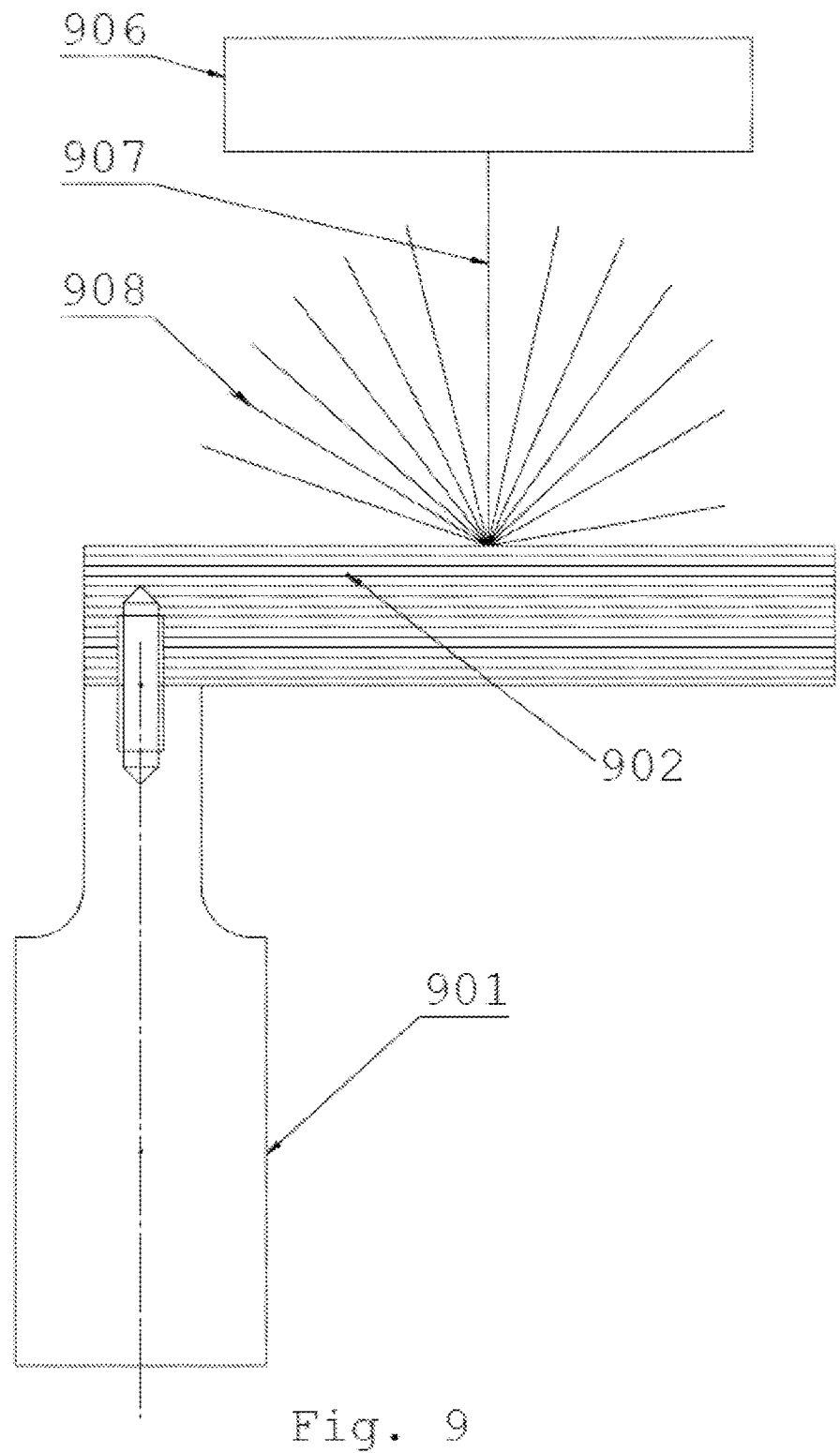
FIG. 9 presents the system for liquid metals atomization with the use of the ultrasound system according to the invention.

FIG. 9 presents the ultrasound system according to the invention during atomization of the liquid alloy. Bronze CuSn6 was melted at temperature of 1200° C. in a graphite crucible 906, then it was applied as stream having diameter of 0.5 mm 907 poured on the composite waveguide 902 made of a carbon fiber in the matrix of silicon carbide, wherein a participation of the fiber to the matrix was like 60:40, and the fibers were distributed orthogonally to the axis of the ultrasound transducer 901 with a capacitance of 11.9 nF, with PZT 8 ceramics and an operating frequency 20 kHz at 20 μm amplitude of the transducer, obtaining an aerosol of the liquid metal 908 crystallizing into a powder with a gradation of +50-75 μm.

Figure 10:
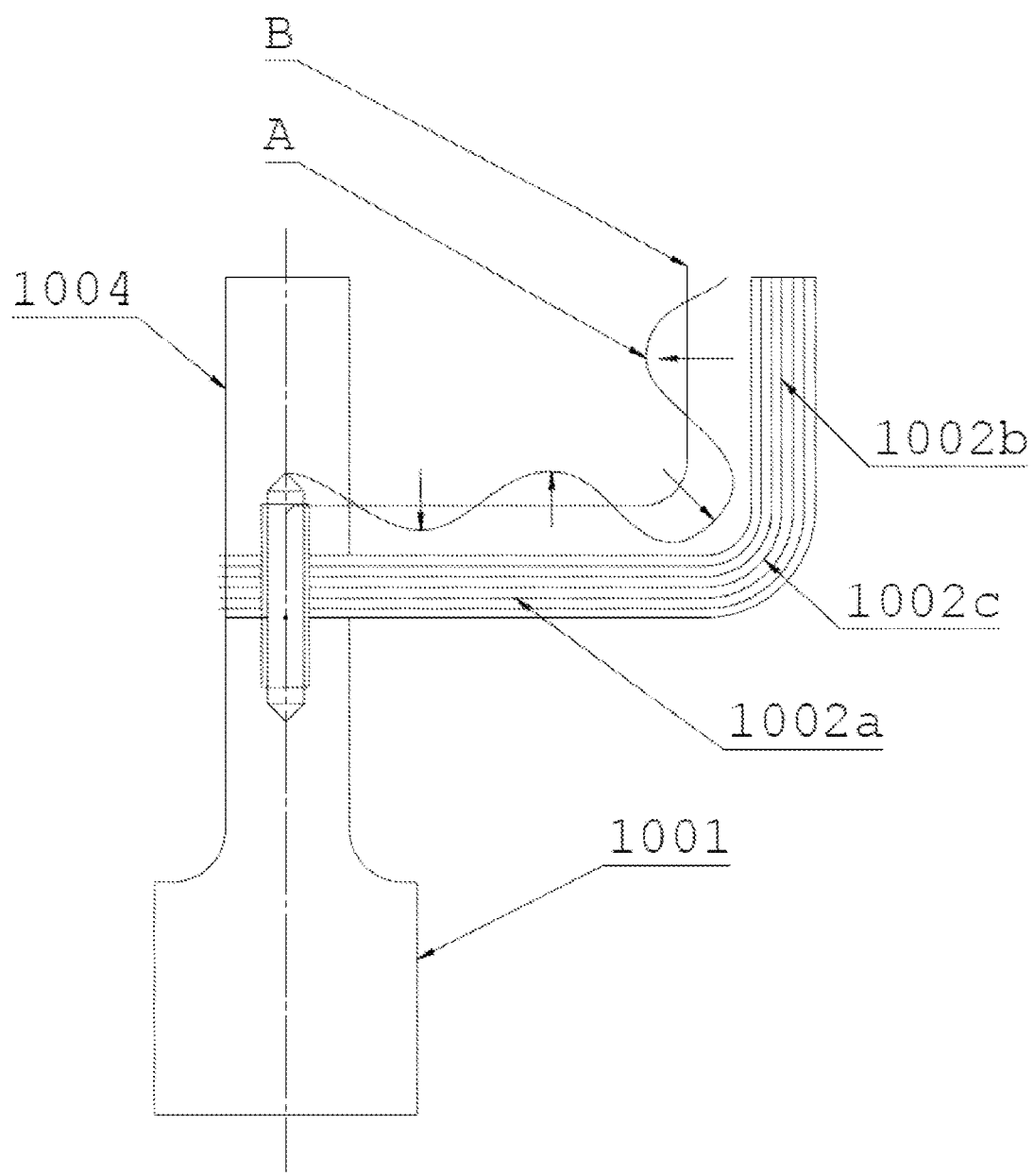
FIG. 10 presents the ultrasound system with the waveguide of fibrous material with the orthogonal part and non-orthogonal part to the axis of the transducer according to the tenth embodiment.

FIG. 10 presents the ultrasound system according to the tenth embodiment with the composite waveguide 1002*a-c*, consisting of the orthogonal part 1002*a* connected to the piezoelectric transducer 1001 and the non-orthogonal part 1002*b* connected to the orthogonal part of the waveguide 1002*a* in such way that in the non-orthogonal part of the waveguide 1002*b* the transverse wave is excited and the fibers of the composite maintain continuity between the orthogonal part 1002*a* and the non-orthogonal part of the waveguide 1002*b*. Second metallic waveguide 1004 presses the composite waveguide 1002 to the piezoelectric transducer 1001 with a capacitance of 11.9 nF, with PZT 8 ceramics and an operating frequency of 20 kHz, providing a uniform pressure. The composite waveguide 1002 consists of the continuous carbon fibers in the matrix of graphite, it has a thickness of 5 mm, the width of 40 mm and is formed in such way, that the orthogonal part 1002*a* of the composite waveguide having a length of 100 mm, is then connected to the non-orthogonal part of the waveguide 1002*b* having a length of 50 mm, by means of the intermediate part 1002*c* of the composite waveguide having a bending radius of 20 mm. In a drawing, the amplitude A of the standing wave was indicated having the envelope schematically indicated near the composite waveguide 1002 together with the line representing the neutral surface B. In a case of the waveguide, which comprises non-orthogonal parts it is critical for a part of the waveguide connected to transducer to be orthogonal to it, for the bending radius of the waveguide to be bigger than its thickness, and for the fiber of the composite to maintain the continuity between the orthogonal part 1002*a* and the non-orthogonal part 1002*b*. Using the waveguide according to the embodiment allows for introducing complicated constructions into vibrations e.g. crucibles consisting of fibrous composites.

In the further example the ultrasound system according to the invention were used for degasification of the liquid aluminum alloy. Aluminum alloy AlSi12 was melted at the temperature of 800° C. in a graphite crucible, a composite waveguide covered with a layer of pyrolitic carbon by e method of vapour phase deposition, consisting of fibers of silicon carbide in a matrix of silicon carbide was immersed in it, connected orthogonally to the transducer operating at a frequency of 20 kHz. Using a pyrolitic carbon as a coating, which does not react with the liquid aluminum alloy allows for increasing the lifetime of the waveguide by limiting the silicon diffusion to the alloy.

In a further example the ultrasound system according to the invention was used for a dispersion of ceramics in liquid copper. Electrolytic copper M1E was melted at the temperature of 1300° C. in a graphite crucible and 1% by mass of aluminum oxide powder was added with an average grain size of 10 μm and then a composite waveguide consisting of carbon fibers in a graphite matrix and covered with a layer of silicon carbide was immersed in it. Using of silicon carbide as a coating multiple times harder than a carbon substrate allowed for limiting an abrasive destruction of the composite waveguide.

In a further embodiment the ultrasound system according to the invention was used for atomization of the liquid alloy. Bronze CuSn6 was melted at a temperature of 1200° C. in a graphite crucible, then it was poured with a stream of a diameter of 2 mm on a waveguide made of a fibrous carbon in a carbon matrix, wherein fibers were arranged orthogonally to the axis of the ultrasound transducer, and the waveguide was covered with a layer of niobium with a thickness of 20 μm and an average grain size of 200 nm obtained by physical vapour deposition (PVD). Using of the metallic layer on a surface of the waveguide allowed for increasing its wettability by the liquid alloy CuSn8 and as a consequence increasing the atomization process efficiency twofold maintaining a high quality of a final product.

In a further embodiment the ultrasound system according to the invention was used for atomization of a liquid alloy. Aluminum alloy 7075 was melted at a temperature of 800° C. in a crucible of aluminum oxide, then it was poured with a stream with diameter of 0.5 mm on a waveguide with dimensions 20×100×0.5 mm, made of a composite on a matrix of niobium with a reinforcement of the aluminum oxide fibers with a structure of a sapphire with a diameter of 50 um, wherein the fibers were arranged in a form of a mat, in which fibers were oriented randomly and a partition of the fibers constituted 20% of a composite volume, and the mat was oriented perpendicularly to the axis of the ultrasound transducer operating at a nominal frequency of 40 kHz. Using of the fibers of aluminum oxide allowed for increasing a life-time of the composite waveguide and excluding a possibility of contamination by other elements.

In a further embodiment, the ultrasound system according to the embodiment of the invention was used for liquid alloy atomization. CuCrZr alloy was melted at a temperature of 1200° C. in a crucible of aluminum oxide, then it was poured with a stream with a diameter of 0.5 mm on a waveguide with dimensions 20×100×0.5 mm made of a composite on a niobium matrix with a reinforcement of tungsten fibers, dispersionally strengthened by lanthanum oxide with a diameter of 100 um, wherein the fibers were arranged uni-directionally perpendicular to the axis of the ultrasound transducer operating at a nominal frequency of 40 kHz, and a composite waveguide was obtained by isostatic hot pressing of tungsten fibers in a niobium capsule. Using of the fibers of tungsten dispersionally strengthened eliminated a possibility of contamination by ceramics particles during atomization of the alloy.

In a further embodiment the ultrasound system according to the invention was used for liquid alloy atomization. Bronze CuSn6 was melted at a temperature of 1200° C. in a graphite crucible, then it was poured with a stream with a diameter of 2 mm on the composite waveguide with a reinforcement made of carbon fiber in a carbon matrix, wherein the fibers were arranged orthogonally to the axis of the ultrasound transducer, and the waveguide was covered with a layer of pyrolytic carbon with a thickness of 200 μm, and then with a layer of tungsten with a thickness of 10 μm obtained by physical vapour deposition. Using of an intermediate layer in a form of pyrolytic carbon between the tungsten layer and the carbon substrate allowed for limiting of carbides formation between the tungsten layer and the carbon substrate due to the lower chemical activity of the pyrolytic carbon, and for decreasing of mismatch of modulus of elasticity of the tungsten layer and the carbon substrate. As a consequence the lifetime of the system was increased threefold in a comparison to the tungsten layer without the substrate of the pyrolytic carbon.

The person skilled in the art acquainted with the present description is able to routinely propose other shapes of the waveguide and configuration of transducer, e.g. the waveguide of a variable shape or thickness, various methods of connection of the waveguide to the transducer, the composites with a fiber adapted to the shape of the waveguide and coatings and diffusive layers adapted to working in a particular medium, as well as other solutions in a range of concrete matrix and reinforcement materials, and adequate lengths of fibers depending on a geometry and application of the waveguide. In particular, the person skilled in the art acquainted with methods of manufacturing of metals and connecting them with metals is able to propose various methods of application of coatings, including thermal spraying, vacuum metallization, diffusion welding and reactive infiltration. The person skilled in the art is able to select vibration frequency to the application.

Discussed embodiments are intended to illustrate the invention defined by the claims and should not be treated as limiting. The person skilled in the art will notice, the sonotrode suitable for liquid metal processing and their alloys can also find other applications, and a claim only indicates, that it has to be suitable in particular for metal and their alloys processing. In particular the invention also finds application in ceramics processing and glass processing. Despite the division into embodiments, technical solutions used in embodiments can be used together, interchangeably or in combinations.

The invention claimed is:

1. An ultrasound system for processing of liquid metals and their alloys, comprising at least one ultrasound transducer and at least one composite waveguide made of a composite material comprising a reinforcement and a matrix, wherein the ultrasound transducer is coupled with the composite waveguide so that during operation it is configured to excite a standing wave of mechanical vibrations in the composite waveguide for processing of liquid metal or metal alloy, characterized in that the matrix comprises a metallic and/or ceramic material, whereas the reinforcement comprises fibers of metallic and/or ceramic material, wherein the ultrasound transducer is coupled with the composite waveguide which is configured to excite in the composite waveguide mechanical vibrations transverse to fibers of the reinforcement.

2. The ultrasound system according to claim 1, characterized in that the matrix comprises a ceramic material.

3. The ultrasound system according to claim 2, characterized in that the matrix comprises a material selected from a group consisting of: carbon and silicon carbide and mixtures thereof.

4. The ultrasound system according to claim 1 characterized in that the composite waveguide is covered with a metallic coating or a diffusive metallic layer comprising at least one metal or metal alloy chosen from a group consisting of titanium, niobium, tantalum, rhenium, tungsten, molybdenum and iridium.

5. The ultrasound system according to claim 1, characterized in that the matrix comprises a metallic material whereas the reinforcement comprises a fibrous ceramic material.

6. The ultrasound system according to claim 1 characterized in that the reinforcement comprises a fibrous material chosen from a group consisting of carbon and silicon carbide and mixtures thereof.

7. The ultrasound system according to claim 1, characterized in that the matrix material comprises at least one metal or metal alloys chosen from a group consisting of: titanium, niobium, tantalum, rhenium, tungsten, molybdenum and iridium.

8. The ultrasound system according to claim 1 characterized in that the composite waveguide is covered with a ceramic protective coating or layer comprising a material chosen from a group consisting of pyrolytic carbon, silicon carbide and vitreous carbon.

9. The ultrasound system according to claim 1, characterized in that the ultrasound transducer is coupled with the composite waveguide by means of a metallic waveguide.

10. The ultrasound system according to claim 1, characterized in that it comprises a second metallic waveguide, whereas the composite waveguide is coupled with the ultrasound transducer so that it is located between the ultrasound transducer and the second metallic waveguide, wherein the ultrasound transducer is coupled with the second metallic transducer by means of threaded connector.

11. The ultrasound system according to claim 1, characterized in that the composite waveguide is coupled with more than one ultrasound transducer, wherein the ultrasound transducers are located at a distance equal to a multiple of a length between antinodes of the standing wave in the composite waveguide during the system operation.

12. The ultrasound system according to claim 1, characterized in that the composite waveguide is bent and the fibers of the reinforcement maintain continuity at a place of bending.

13. The ultrasound system according to claim 1, characterized in that the composite waveguide has a periodic structure of the reinforcement fibers and the ultrasound transducer is adapted to generate standing wave of vibrations having neutral surface wherein a distance of fibers from the neutral surface is variable and configured so that during the system operation, the fibers are located closer to the outer surface of the waveguide in a neighborhood of the antinodes of the standing wave than in the neighborhood of the nodes of the standing wave.

14. A method of processing of materials comprising liquid metals and their alloys characterized in that a material is melted and the melted material is subjected to the operating of a vibrating waveguide in an ultrasound system, characterized in that the ultrasound system as described in claim 1 is used.

* * * * *